UNITED STATES PATENT OFFICE.

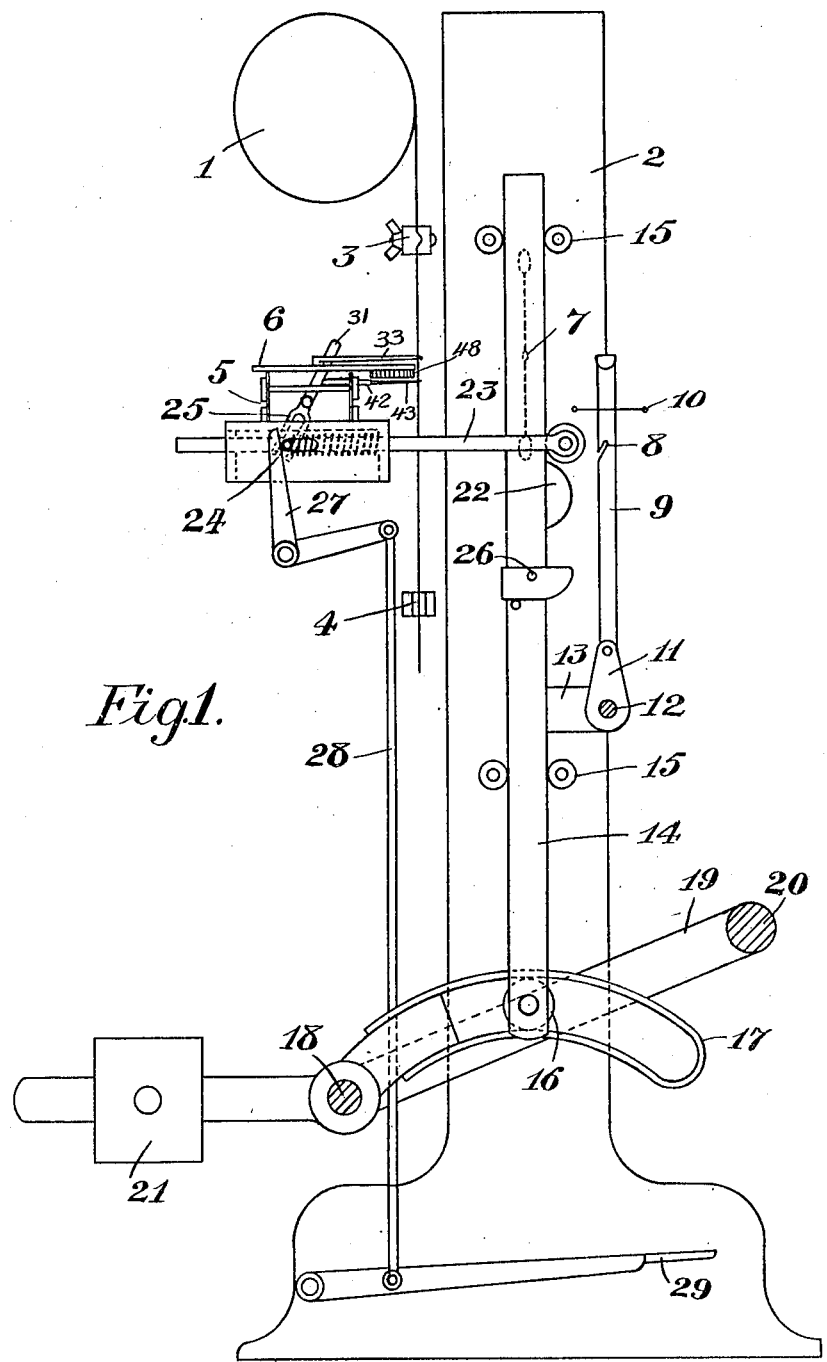

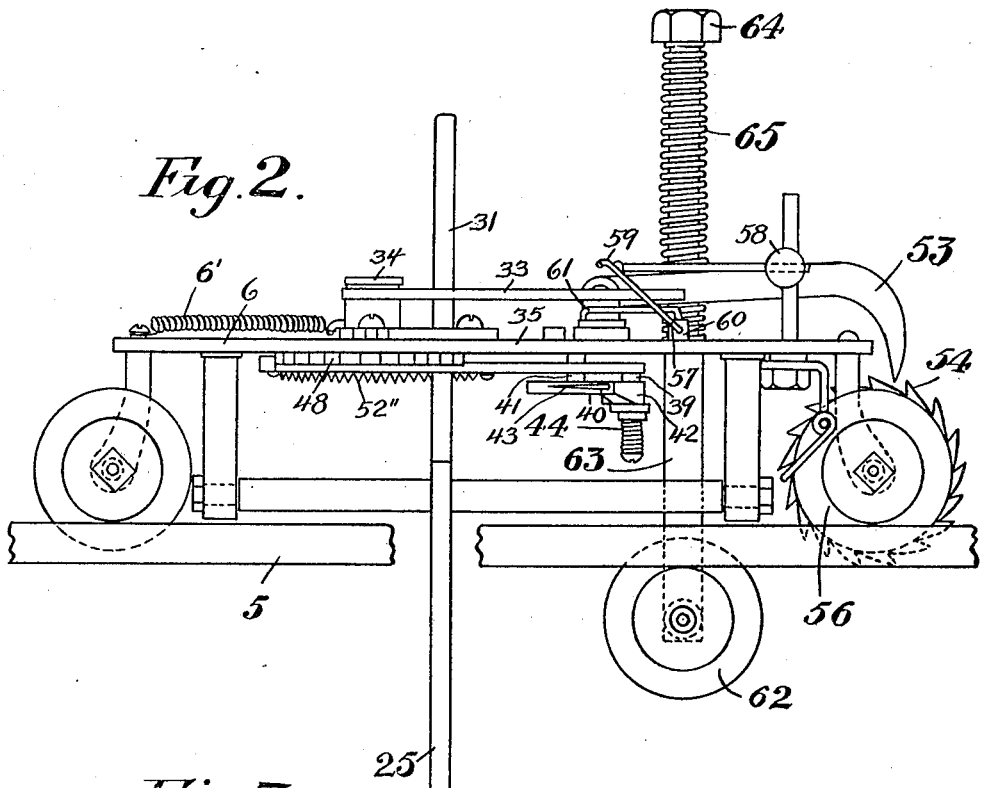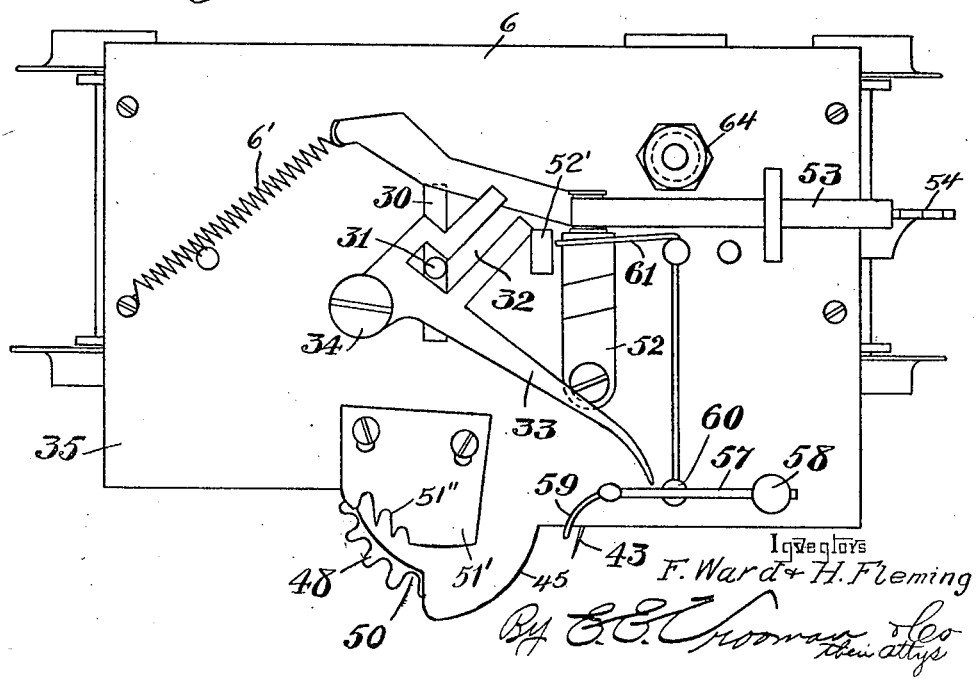

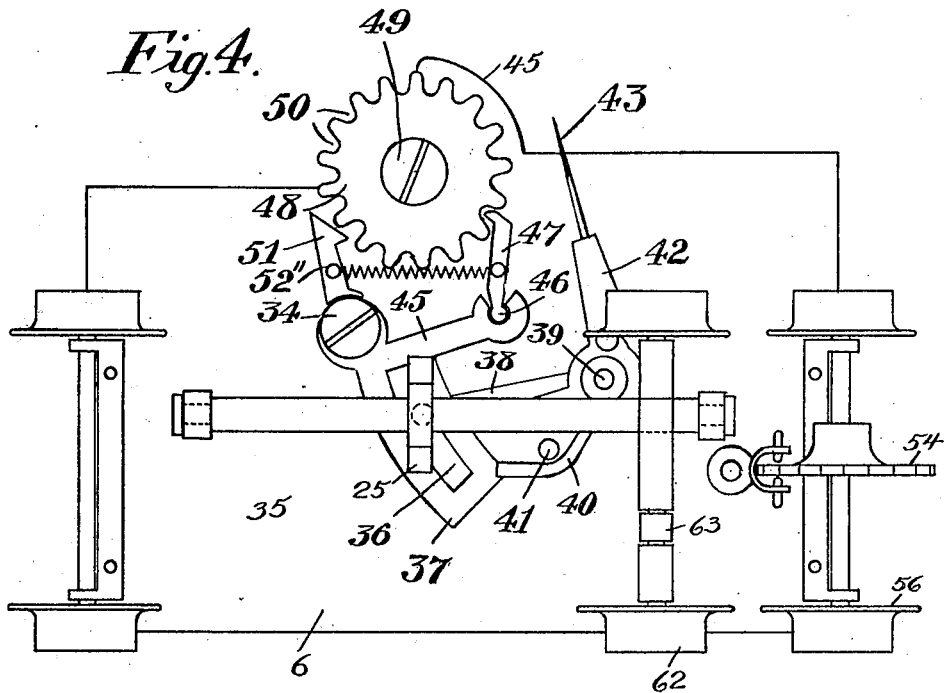
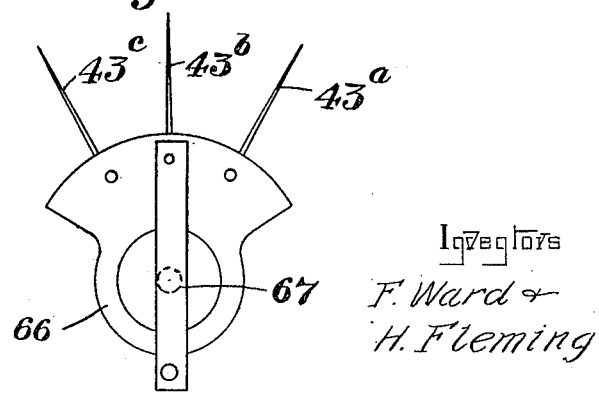

FRANK WARD, OF BLACKBURN, AND HARRY FLEMING, OF ABBEY VILLAGE, NEAR CHORLEY, ENGLAND.

DEVICE FOR FACILITATING THE THREADING OR DRAWING-IN OF WEAVING-WARP.

1,292,175.  Specification of Letters Patent.  Patented Jan. 21, 1919.

Application filed August 15, 1917. Serial No. 186,405.

*To all whom it may concern:*

Be it known that we, FRANK WARD and HARRY FLEMING, subjects of the King of Great Britain, residing at Blackburn and Abbey Village, near Chorley, both in the county of Lancaster and Kingdom of England, respectively, have invented certain new and useful Improvements in Devices for Facilitating the Threading or Drawing-in of Weaving-Warp, of which the following is a specification.

The present invention relates to improvements in devices for facilitating the threading or drawing-in of weaving warp into reeds for looms.

The invention will be more particularly described with reference to the accompanying drawings in which:—

Figure 1 is a side elevation of the complete device in one form;

Fig. 2 is a side elevation of the improved selecting mechanism;

Fig. 3 is a corresponding top plan view;

Fig. 4 is a corresponding bottom plan view, and

Fig. 5 is a detailed view.

The warp ends are carried by a beam 1 carried on a frame-work 2 in any usual manner. The ends are clamped above the place at which they are engaged with the selecting mechanism by a stiff clamp 3 and below this point by a loose clamp 4 in usual manner. Rails 5 are disposed transversely of the frame 2 to carry a carriage 6, on which is mounted mechanism for selecting the individual ends and passing the same one at a time to a suitable position for the operator who passes a hook through the heald eyes 7 to one or more ends. The operator then pulls the hook out again through the eye 7 and will cause the ends on the hook to enter into engagement with the eye 8 of a dent hook 9 which is mechanically operated, that is to say the dent hook 9 is reciprocated up and down and thereby fed in known manner through the consecutive teeth of the reed 10. A well known form of automatic dent hook usually hand operated consists of a loose blade held in a spring clip on a handle. An automatic dent hook is not shown. A form of automatic hook is shown in British Patent No. 101,511 of 1916.

The dent hook 9 is carried by a slide 11 sliding freely on a bar 12 transversely of the frame 2. This bar 12 is carried at each end by a bracket 13 extending from a vertical rod 14 which is mounted to slide vertically between pairs of guides 15. The rod 14 at its lower end is forked and carries a roller 16 engaging a curved slot in a lever 17 keyed to a shaft 18 which passes transversely across the frame 2 and has also keyed to it arms 19 supporting a hand or operating rail 20. The rail 20 and other mechanism keyed to the shaft 18 is preferably counter-weighted as at 21. The vertical rod 14 is provided with an operating cam 22 which as the rod 14 moves up and down engages a roller on the plunger 23 and causes said plunger 23 to reciprocate horizontally. The plunger is spring controlled and causes the movement in a horizontal plane of a bar 24 stretching transversely across the frame 2 and therefore parallel with the beam 1, which bar 24 engages in a fork 25 pivoted on the carriage 6. It will be seen therefore that to operate the machine the operator will swing the rail 20 by foot or hand and with one hand will operate the drawing-in hook passing the same through one or more heald eyes 7 taking up ends which have been laid out in a convenient position and passing them to the eye 8 of the mechanical dent hook. In using this machine therefore the operator would be only using two hands or one hand and one foot and further only one operator is necessary for the machine which reduces the manual labor necessary for drawing-in to a minimum. The device as shown will obviously cause the selection of two ends for every operation of the dent hook 9. In certain cases it may be desirable to present three ends to be drawn through each space of the reed 10, in which case a pawl cam 26 may be provided pivoted to the bar 14 which would only operate the plunger 23 when the bar 14 is moving in one direction. The cam 22 upon its upward movement operates plunger 23 to present one thread and pawl cam 26 and cam 22 upon their downward movement, each successively operates plunger 23 to present the second and third threads.

Should for any reason the selecting device mounted on the carriage 6 miss an end then the fork 25 may be oscillated without interrupting the normal sequence or synchronism with the bar 14. For this purpose a bell crank lever 27 is provided which is connected to a rod 28 operated by means of a foot pedal or the like 29 which can be used to repeat the selecting operation of an end which has been missed.

It is obvious that various mechanisms for selecting ends in correct sequence and presenting them opposite the desired heald eye 7 may be used. The arrangement to be described with reference to Figs. 2 to 5 may if desired be used or of course this latter arrangement can be used where the dent hook 9 is reciprocated by hand and is not in positive connection with the selecting mechanism.

The carriage 6 is slotted at 30 for the passage of the pin 31 of the fork 25. The pin 31 engages with a cam slot 32 of a feeding pin 33 pivoted at 34 to the plate 35 of the carriage. The pin 31 also passes through a cam slot 36 in an arm 37 pivoted about the same pivot 34 where it extends below the bottom of the carriage 6. This arm 37 has an extension 38 which carries a pivot 39 at its end on which is mounted a bell crank lever, one arm of which 40 is curved and is guided by a pin 41. The other arm 42 carries a selecting needle 43. The bell crank lever 40, 42 is free to turn about the pivot 39, a torsion spring 44 holds the arm 40 in constant contact with the pin 41. A second arm or extension 45 is provided on the arm 37 which is pivoted at 46 to a feed pawl 47 engaging with a ratchet drum 48 pivoted at 49 to the plate 35. The notches 50 between the teeth of the ratchet drum 48 also serve the purpose of spacing the ends as will be hereinafter explained. A pawl 51 loosely pivoted about 34 acts as a locking pawl for the drum 48, the two pawls 47 and 51 being controlled by a spring 52″. It will be seen therefore that oscillation of the fork 25 will cause the end of the needle 43 (Fig. 3) to pick off one of a number of ends resting against the edge of the plate 35 and move it toward a curved surface 45 on the plate 35. As it comes toward this curved surface 45 it is engaged by the point of the arm 33 which moves it over the cam surface 45 when it slips into one notch 50 of the ratchet wheel 48. It should be understood that as the fork 25 swings forwardly, the pawl 47 will engage one tooth and thereby rotate the ratchet drum 48 the distance of one tooth and as the fork 25 is swung backwardly the pawl 47 slips back a tooth. When the fork 25 is again swung forwardly, the same will engage the next succeeding tooth of the ratchet drum 48. A guard plate 51′ having a plurality of stepped stops 51″ is provided adjustably mounted on the plate 35 to act as a stop for the ends of the drawing-in hook which is threaded through the heald eyes and merely pushed against the plate 51′ when it will be obvious that on pulling out the drawing hook any ends which lie in a spaced position between the teeth 50 of the ratchet drum 48 will be taken away through the heald eyes and thence to the dent hook mechanically operated or otherwise.

Means are further provided for feeding the carriage forward along the row of ends step by step. For this purpose a curved arm 52 is pivoted in the top of the plate 35 and extends over the slot 30 in the path of the pin 31 so that the arm 52 will be swung about its pivot at each oscillation of the fork 25 against the resistance of spring 6′. A stop 52′ is carried by the plate 35 for limiting the swing of the lever 52 in one direction. This will normally cause the horizontal oscillation of a feed pawl 53 which is adapted to engage in the teeth of a ratchet wheel 54 carried by the spindle of one of the pairs of wheels 56 which support the carriage 6 on the rails 5. It will consequently be seen that when the pawl 53 is moving to and fro the carriage 6 will be moved along the row of ends the distance of one tooth of the ratchet wheel 54 at a time.

To prevent too rapid feed of the carriage a feeler 57 is mounted on the plate 35 having a preferably adjustable counter-weight 58 which gravity feeler has an arm 59 extending in the path of the ends so that when a number of ends are lying against the arm 59 the feeler will move about its pivot 60 and consequently cause a catch arm 61 to move over and retain the arm 52 to prevent its further oscillation by the pin 31. When, however, pressure of the ends on the arm 59 is released, the counter-weight 58 acts to lift the catch arm 61 out of engagement with the arm 52 and the carriage can then be fed forward the desired amount.

To enable the carriage to be removed from its supporting rails 5, one pair of wheels, for instance, a pair 62 engaging the under surface of the rails 5, is mounted on a square bar 63 passing through the plate 35 and having a nut 64 at its top end between which and the plate 35 the spring 65 is arranged. The top end of the bar 63 is circular so that the wheels 62 may be pulled down against the action of the spring 65 and turned in a plane at right angles to enable the carriage to be lifted off the rails.

To enable the device to be immediately useful for ends of varying counts the arm 42 may be provided with a carrier such as 66 (Fig. 5) provided with a number of needles 43$^a$, 43$^b$, and 43$^c$ adapted to pick up ends of different counts, a spring 67 enabling the holder 66 to be clamped securely in the position corresponding to the counts of the ends on the warp beam in use.

We declare that what we claim is:—

1. A device for facilitating the threading of a loom reed, consisting of means to select warp ends, means to position the said ends for manual threading through the heald eye, a denting hook reciprocated mechanically through the reed and adapted to move step by step along it for successive engagement with the dents of the reed, and independent means to operate said selecting device an extra time whenever the mechanical selecting device may miss any warp end and thereby maintaining the denting hook in its synchronism therewith.

2. A device for facilitating the threading of a loom reed consisting of means to select warp ends, means to position said ends for manual threading through the heald eye, a denting hook reciprocated mechanically through the reed and adapted to move step by step along it for successive engagement with the dents of the reed, independent means to operate said selecting device an extra time whenever said selecting device may miss any warp end and thereby maintaining the denting hook in its synchronism therewith, and means to operate the selecting means twice or more times for each reciprocation of the denting hook, so that two or more ends are presented in position for drawing-in through the single dent of the reed.

3. A device for facilitating the threading of a loom reed, consisting of a frame supporting the reed, a transverse bar on said frame, a dent hook, adapted to move along step by step and successively through the dents of the reed, and carried by said transverse bar, means to carry the warp beam on said frame, means to select one end at a time from the warp depending from said beam, a finger positioning said ends in a position remote from the path of the dent hook for their manual transference to the dent hook, means for holding such end when positioned by the finger, and actuating means connected to said finger and said transverse bar to operate the finger in synchronism with the dent hook.

4. A device for selecting the ends in the drawing-in of weaving warps comprising in combination, a needle adapted to select warp ends, a moving positioning finger for acting on said end, and a toothed wheel rotating step by step in synchronism with the needle and finger which in turn takes up an end in one of its teeth as it is received from the said finger, so that successive ends are selected in spaced teeth on its periphery in predetermined relationship.

5. A device for selecting the ends in the drawing-in of weaving warps comprising in combination, a needle adapted to select warp ends, a moving positioning finger for acting on said end, a toothed wheel rotating step by step in synchronism with the needle and the finger which in turn takes up an end in one of its teeth as it is received from the said finger, so that successive ends are selected in spaced teeth on its periphery in predetermined relationship, and a guard plate arranged in proximity to the rotating drum to receive and limit the position of the manually operated drawing-in hook.

6. A device for selecting the ends in the drawing-in of weaving warps comprising in combination, a needle adapted to select warp ends, a moving positioning finger for acting on said end, a toothed wheel rotating step by step in synchronism with the needle and the finger which in turn takes up an end in one of its teeth as it is received from the said finger, so that successive ends are selected in spaced teeth on its periphery in predetermined relationship, and an adjustable guard plate arranged in proximity to a rotating drum, and having a plurality of stepped stops to receive and limit the position of the manually operated drawing-in hooks.

7. A device for selecting the ends in the drawing-in of weaving warps comprising in combination, a needle adapted to select warp ends, a moving positioning finger for acting on said ends, a toothed wheel, rotating step by step in synchronism with the needle and the finger, which in turn takes up an end in one of its teeth as it is received from the said finger, so that successive ends are selected in spaced teeth on its periphery in predetermined relationship, an operating bar for operating said finger, said selecting needle, and said toothed wheel, a reciprocating rod supported adjacent said operating bar, tappets carried by said rod for reciprocating said bar as said rod is reciprocated.

8. A device for selecting the ends in the drawing-in of weaving warps, comprising in combination with the needle to select warp ends, a moving positioning finger for acting on an end, a toothed wheel rotating step by step in synchronism with the needle and finger which in turn takes up an end in one of its teeth as it is received from the said finger, so that successive ends are selected in spaced teeth on its periphery in predetermined relationship, an operating bar or plunger for operating said finger, said selecting needle and said toothed wheel, a reciprocating rod supported adjacent said operating bar, cams carried by said rod, one of which is mounted to engage and swing said bar as said rod is reciprocated.

In witness whereof, we have hereunto signed our names this 12th day of July 1917, in the presence of two subscribing witnesses.

FRANK WARD.
HARRY FLEMING.

Witnesses:
ERNALD SIMPSON MOSELEY,
MARION E. CLOUD.